(12) United States Patent
Peng

(10) Patent No.: US 12,086,092 B2
(45) Date of Patent: Sep. 10, 2024

(54) MULTICHIP SYSTEM HAVING COMMAND TRANSFER MECHANISM AND ADDRESS GENERATING METHOD

(71) Applicant: SigmaStar Technology Ltd., Fujian (CN)

(72) Inventor: Peng Peng, Shenzhen (CN)

(73) Assignee: SIGMASTAR TECHNOLOGY LTD., Fujian (CN)

(*) Notice: Subject to any disclaimer, the term of this patent is extended or adjusted under 35 U.S.C. 154(b) by 40 days.

(21) Appl. No.: 17/979,981

(22) Filed: Nov. 3, 2022

(65) Prior Publication Data

US 2023/0273892 A1    Aug. 31, 2023

(30) Foreign Application Priority Data

Feb. 25, 2022    (CN) .......................... 202210179146.1

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/4221; G06F 13/4022; G06F 13/4027; G06F 13/404; H04L 49/10; H04L 49/253

See application file for complete search history.

(56) References Cited

U.S. PATENT DOCUMENTS

| | | | | |
|---|---|---|---|---|
| 2010/0241781 A1* | 9/2010 | Wetzel | .................. | G06F 13/385 710/49 |
| 2010/0250807 A1* | 9/2010 | Miyoshi | .............. | G06F 13/4027 710/316 |
| 2014/0173167 A1* | 6/2014 | Choi | .................... | G06F 13/4022 710/316 |
| 2016/0117281 A1* | 4/2016 | Akaike | ................. | G06F 13/362 710/313 |
| 2017/0031835 A1* | 2/2017 | Serebrin | ............. | G06F 13/4022 |
| 2023/0161728 A1* | 5/2023 | Liu | ...................... | G06F 13/4022 710/105 |
| 2023/0251990 A1* | 8/2023 | Sodke | ................. | G06F 13/4265 710/316 |

* cited by examiner

*Primary Examiner* — Phong H Dang

(74) *Attorney, Agent, or Firm* — Edell, Shapiro & Finnan, LLC

(57) ABSTRACT

A multichip system includes a transmitter-end chip and a receiver-end chip. The transmitter-end chip includes a first port. The receiver-end chip includes a second port. The first port is connected to the second port, and an operating mode of the first port is different from an operating mode of the second port. When the transmitter-end chip is coupled to the receiver-end chip without through another chip, the transmitter-end chip determines a first target address of the receiver-end chip with respect to the transmitter-end chip according to the operating mode of the first port, and transfers a command to the receiver-end chip according to the first target address, such that the receiver-end chip executes the command.

9 Claims, 3 Drawing Sheets

MULTICHIP SYSTEM HAVING COMMAND TRANSFER MECHANISM AND ADDRESS GENERATING METHOD

This application claims the benefit of China application Serial No. CN202210179146.1, filed on Feb. 25, 2022, the subject matter of which is incorporated herein by reference.

BACKGROUND OF THE INVENTION

Field of the Invention

The present application relates to a multichip system, and more particularly, to a multichip system and an address generating method applicable to a command transfer mechanism for a multi-stage chip.

Description of the Related Art

In a current multichip system, functions of a master chip are usually different from those of a slave chip. When a specific function needs to be completed with the collaboration of a master chip and a slave chip, a developer of the multichip system needs to design a set of codes for controlling the master chip and a set of codes for controlling the slave chip according to application scenarios of the multichip system. In case of adjustment needed for the application scenarios of the multichip system or the specific function, command transmission, reception and transfer need to be performed among multiple chips. A current chip is usually provided with a Peripheral Component Interconnect Express (PCI-E) interface, and so data exchange and command transmission and reception can be performed using the PCI-E interface. However, in current techniques, the mechanism that performs transmission, reception and transfer using the PCI-E interface is hardly considered comprehensive.

SUMMARY OF THE INVENTION

In some embodiments, it is an object of the present application to provide a multichip system and address generating method having a command transfer mechanism so as to improve the issues of the prior art.

In some embodiments, a multichip system includes a transmitter-end chip and a receiver-end chip. The transmitter-end chip includes a first port. The receiver-end chip includes a second port. The first port is connected to the second port, and an operating mode of the first port is different from an operating mode of the second port. When the transmitter-end chip is coupled to the receiver-end chip without through another chip, the transmitter-end chip determines a first target address of the receiver-end chip with respect to the transmitter-end chip according to the operating mode of the first port, and transfers a command to the receiver-end chip according to the first target address, such that the receiver-end chip executes the command.

An address generating method applied to multichip is provided according to an embodiment of the present application. The multiple system includes a transmitter-end chip and a receiver-end chip. The transmitter-end chip includes a first port, and the receiver-end chip includes a second port, wherein the first port is connected to the second port. The address generating method includes: the transmitter-end chip determining a first target address of the receiver-end chip with respect to the transmitter-end chip according to an operating mode of the first port; and the transmitter-end chip transferring a command to the receiver-end chip according to the first target address.

In some embodiments, the multichip system is capable of setting respective target addresses of various chips using operating modes and identifiers of buses of the chips. As such, a chip in the multichip system can transfer commands to another chip. The above command transfer mechanism relates to only identifiers of hardware and target addresses of scripts. Thus, the command transfer mechanism does not involve code modification, and is hence highly universally applicable.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

In some embodiments, a multichip system provided according to some embodiments of the present application is capable of implementing a message/command synchronization mechanism among various chips, so that the chip can drive itself or another chip by means of command transfer in an environment with connections via a predetermined connection interface to further perform a corresponding operation, hence achieving a highly universally applicable logic application environment. In different applications, the multichip system provided according to some embodiments of the present application can define functions, command and/or or parameter types by using C++ codes and/or a software framework in a Linux system; however, the present application is not limited to these examples.

Figure 1:
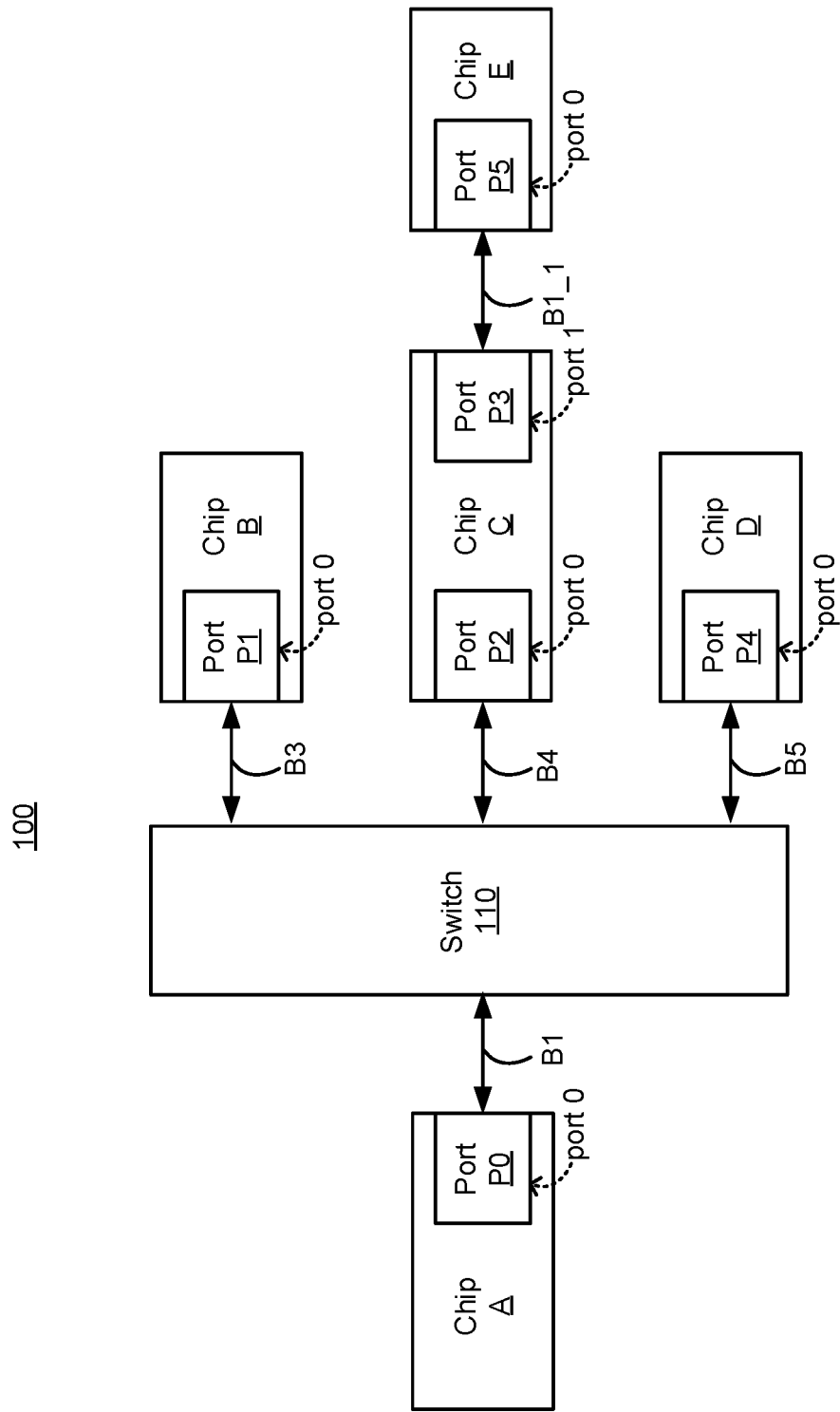
FIG. 1 is a schematic diagram of a multichip system according to some embodiments of the present application.

FIG. 1 shows a schematic diagram of a multichip system 100 according to some embodiments of the present application. The multichip system 100 includes multiple chips A to E and a switch 110. The chip A includes a port P0, the chip B includes a port P1, the chip C includes a port P2 and a port P3, the chip D includes a port P4, and the chip E includes a port P5. In some embodiments, the switch 110 is a switch having a Peripheral Component Interconnect Express (PCI-E) interface, and the port P0 of the chip A can be coupled to the port P1 of the chip B, the port P2 of the chip C and the port P4 of the chip D through the PCI-E interface. The port P3 of the chip C is coupled to the port P5 of the chip E.

The configuration of the chip A with respect to the each of the chips B, C and D connected thereto is in a first-order connection. In this example, the chip A is operable as a master chip, and the remaining chips B to E are operable as slave chips. In the above condition, based on related standards of the PCI-E bus, the operating mode of the port P0 and the operating modes of the other ports P1, P2 and P4 are different modes. For example, the operating mode of the port P0 is a root complex (RC) mode, and the operating modes of the other ports P1, P2 and P4 are an endpoint (EP) mode. The RC mode is an operating mode of a master chip in a PCI-E system, and such master chip is connectable to only a port operating in the EP mode. The EP mode is an operating mode of a slave chip in a PCI-E system. Moreover, the chip A is connected to the chip E through the chip C, and thus the chip A and the chip E are in a second-order connection, wherein the port P3 and the port P5 operate in different modes. For example, the port P3 operates in the RC mode, and the port P5 operates in the EP mode.

In some embodiments, a corresponding chip (to be referred to as a transmitter-end chip) among the multiple chips A to E can use related operations to be discussed below to identify a relative target address of another chip (to be referred to as a receiver-end chip) among the multiple chips A to E in the multichip system 100, and use the target address to transfer a command to the receiver-end chip, so as to control the receiver-end to execute a subsequent command. To understand the operation of command transfer, operation examples of multiple methods for determining a target address and command transfer are to be sequentially described below. In different embodiments, the transmitter-end chip can be a master chip or a slave chip, and the receiver-end chip can also be a slave chip or a master chip.

(1) When the transmitter-end chip and the receiver-end chip are in a first-order connection and the port of the transmitter-end chip operates in the EP mode, the method for determining the target address of the receiver-end chip is as follows.

In some embodiments, when the connection between the transmitter-end chip and the receiver-end chip are a first-order connection (that is, the transmitter-end chip is connected to the receiver-end chip without through another chip), the transmitter-end chip can determine the target address of the receiver-end chip with respect to the transmitter-end according to the operating mode of the port of the transmitter-end chip, and transfer a command to the receiver-end chip according to the target address of the receiver-end chip, such that the receiver-end chip executes the command.

For example, the transmitter-end chip is the chip C, and the receiver-end chip is the chip A. Since the port P2 of the chip C operates in the EP mode (that is, the chip C operates as a slave chip with respect to the chip A), the chip C can determine the target address of the chip A with respect to the chip C according to an identifier of the port P2. In some embodiments, a corresponding port in a corresponding chip among the multiple chips A to E has an identifier. For example, the chip A includes the port P0, and so the identifier of the port P0 is a first value (for example, 0x10000; denoted as port 0). Alternatively, the chip C includes two ports, namely P2 and P3, wherein the identifier of the port P2 is a first value (for example, 0x10000) and the identifier of the port P3 is a second value (for example, 0x10001; denoted as port 1). The correspondence between the multiple ports P0 to P5 and the identifiers thereof in FIG. 1 can be understood similarly. Since the chip C is connected to the chip A through port P2, the chip C can determine the target address of the chip A as 0x10000 according to the identifier of the port P2.

Accordingly, when the transmitter-end chip and the receiver-end chip are in a first-order connection and the operating mode of the port (connected to the receiver-end chip) of the transmitter-end chip is the EP mode, the transmitter-end chip can determine the target address of the receiver-end chip according to the identifier of the port. The above relation is summarized as Table-1 below:

TABLE 1

| EP mode as operating mode of port of transmitter-end chip | | |
|---|---|---|
| | port 0 as identifier of port | port 1 as identifier of port |
| First-order connection | 0x10000 as target address | 0x10001 as target address |

(2) When the transmitter-end chip and the receiver-end chip are in a first-order connection and the port of the transmitter-end chip operates in the RC mode, the method for determining the target address of the receiver-end chip is as follows.

Compared to the example above, in some embodiments, if the transmitter-end chip operates as a master chip, the transmitter-end chip can further determine the target address according to the identifier of the port of the transmitter-end chip and an identifier of a bus between the port of the transmitter-end chip and the port of the receiver-end chip. For example, the transmitter-end chip is the chip A, and the receiver-end chip is the chip B. Since the port P0 of the chip A operates in the RC mode (that is, the chip A operates as a master chip with respect to the chip B), the chip A can determine the target address of the chip B with respect to the chip A according to the identifier of the port P0 and an identifier of a bus between the port P0 and the port P1.

In some embodiments, the port P0 and any of the other port P1, P2 and P4 are connected through a bus (that is, a PCI-E bus) in the switch 110. For example, the port P0 is connected to the port P1 through a bus B3, the port P0 is connected to the port P2 through a bus B4, the port P0 is connected to the port P4 through a bus B5, and the port P3 is connected to the port P5 through a bus B1_1. Similar to the identifier of the port, each bus has a corresponding identifier. The chip A can determine the target address of the chip B according to the identifier of the port P0 and the identifier of the bus B3. For example, the identifier of the port P0 is a first value (that is, port 0), the chip A can determine that the target address of the chip B is the identifier of the bus B3. Alternatively, if the identifier of the port P0 is a second value (that is, port 1), the chip A can add a predetermined value (for example but not limited to, 128) to the identifier of the bus B3 so as to determine the target address of the chip B. In the example in FIG. 1, the identifier of the port P0 is port 0, and so the chip A uses the first method to determine the target address of the chip B.

Accordingly, when the transmitter-end chip and the receiver-end chip are in a first-order connection and the operating mode of the port (connected to the receiver-end chip) of the transmitter-end chip is the RC mode, the transmitter-end chip can determine the target address of the receiver-end chip according to the identifier of the port and the identifier (denoted as bus_id) of the bus between the transmitter-end chip and the receiver-end chip. The above relation is summarized as Table-2 below:

TABLE 2

| RC mode as operating mode of port of transmitter-end chip | | |
| --- | --- | --- |
| | port 0 as identifier of port | port 1 as identifier of port |
| First-order connection | bus_id as target address | bus_id + 128 as target address |

(3) When the transmitter-end chip and the receiver-end chip are in a second-order connection and the port of the transmitter-end chip operates in the RC mode, the method for determining the target address of the receiver-end chip is as follows.

Compared to the above example, in some embodiments, if the transmitter-end chip is connected to the receiver-end chip through a bridge chip, the transmitter-end chip can transfer the command to the receiver-end chip through the bridge chip. The transmitter-end chip determines the target address of the bridge chip with respect to the transmitter-end chip according to the identifier of the port (connected to the bridge chip) of the transmitter-end chip and the identifier of the bus between the two ports of the transmitter-end chip and the bridge chip, and determines the target address of the receiver-end chip with respect to the bridge chip according to the identifier of the port (connected to the receiver-end chip) of the bridge chip and the identifier of the bus between the two ports of the bridge chip and the receiver-end chip. Thus, the transmitter-end chip can determine the target address of the receiver-end chip with respect to the transmitter-end chip according to the target address of the bridge chip with respect to the transmitter-end chip and the target address of the receiver-end chip with respect to the bridge chip.

For example, in the example in FIG. 1, the chip A and the chip E are in a second-order connection, wherein the transmitter-end chip can be the chip A, the bridge chip can be the chip C, and the receiver-end chip can be the chip E. The chip A can determine the target address of the chip C with respect to the chip A according to the identifier of the port P0 and the identifier of the bus B4 between the port P0 and the port P2. Referring to Table-2 above, it is known that the chip A can set the identifier of the bus B4 as the target address of the chip C with respect to the chip A since the identifier of the port P0 is port 0. Similarly, the chip C can determine the target address of the chip E with respect to the chip C according to the identifier of the port P3 and the identifier of the bus B1_1 between the port P3 and the port P5. Referring to Table-2 above, it is known that the chip C can set the identifier of the bus B1_1 as the target address of the chip E with respect to the chip C since the identifier of the port P3 is port 0. Thus, the chip A can determine the target address of the chip E with respect to the chip A according to the target address of the chip C with respect to the chip A and the target address of the chip E with respect to the chip C. In some embodiments, the chip A can combine a part of bits of the target address of the chip C with respect to the chip A and a part of bits of the target address of the chip E with respect to the chip C as the target address of the chip E with respect to the chip A. For example, the first eight bits of the target address of the chip E with respect to the chip A can be at least a part of bits of the target address of the chip C with respect to the chip A, and the last eight bits of the target address of the chip E with respect to the chip A can be at least a part of bits of the target address of the chip E with respect to the chip C.

In other words, in the configuration of a second-order connection, the transmitter-end chip can sequentially determine the target address (denoted as T0) of the bridge chip with respect to the transmitter-end chip and the target address (denoted as T1) of the receiver-end chip with respect to the bridge chip, and use information of the two addresses above to generate the target address of the receiver-end chip with respect to the transmitter-end chip. Accordingly, when the transmitter-end chip and the receiver-end chip are configured in a second-order connection and the operating mode of the port (connected to the receiver-end chip) of the transmitter-end chip is the RC mode, the method for determining the target address of the receiver-end chip with respect to the transmitter-end chip can be summarized as Table-3 below:

TABLE 3

| RC mode as operating mode of port of transmitter-end chip | | |
| --- | --- | --- |
| | port 0 as identifier of port | port 1 as identifier of port |
| Second-order connection | T0|T1 as target address | T0|T1 as target address |

In Table-3 above, T0|T1 means that leading bits of the target address of the receiver-end chip with respect to the transmitter-end chip can be determined by at least a part of bits of the target address T0 of the bridge chip with respect to the transmitter-end chip, and trailing bits of the target address of the receiver-end chip with respect to the transmitter-end chip can be determined by at least a part of bits of the target address T1 of the receiver-end chip with respect to the bridge chip.

(4) Process and Concept of Command Transfer

Figure 2A:
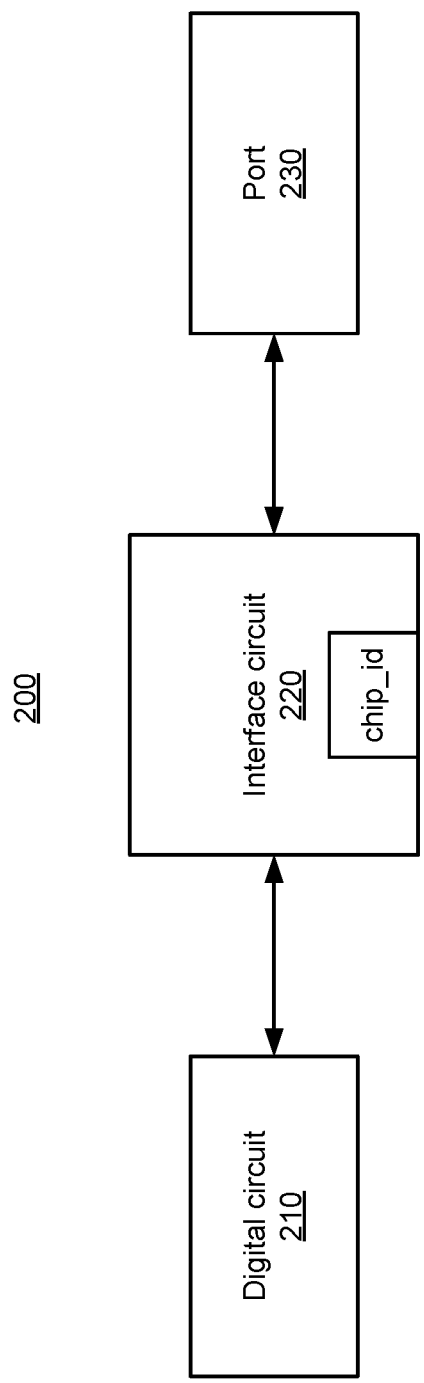
FIG. 2A is a schematic diagram of a chip according to some embodiments of the present application.

FIG. 2A shows a schematic diagram of a chip 200 according to some embodiments of the present application. The chip 200 can be any of the chips A to E. The chip 200 includes at least one digital circuit 210, an interface circuit 220 and at least one port 230. The digital circuit 210 can be a main signal processing circuit in the chip 200, and performs a corresponding operation according to an application of the chip 200. The digital circuit 210 can be, for example but not limited to, such as a processor circuit and an application specific integrated circuit. The interface circuit 220 can be a controller circuit for the PCI-E interface, so as to control transmission of data and/or commands of the port 230. The port 230 can be at least one of the ports P0 to P5 in FIG. 1. For example, if the chip 200 is the chip A, the port 230 can be the port P0. Alternatively, if the chip 200 is the chip C, the port 230 can be the port P2 and the port P3.

The interface circuit 220 can adjust, according to multiple predetermined commands, a chip identifier chip_id stored in the interface circuit 220. The chip identifier chip_id is the target address of the chip that receives the commands with respect to the transmitter chip 200. For example, when a received predetermined command indicates the target address of the chip 200, the interface circuit 220 can set the chip identifier chip_id to a predetermined value (for example, 0). Alternatively, when the received predetermined command is a command for disconnecting a connection for transferring the command, the interface circuit 220 can set the chip identifier chip_id to another value (for example, 1). The digital circuit 210 can determine, according to the chip identifier chip_id, whether to execute the received command. For example, when the chip identifier chip_id is a predetermined value such as 0, the digital circuit 210 can execute the received command. Alternatively, when the chip identifier chip_id is not a predetermined value such as 0, the digital circuit 210 does not execute the received command, extracts the identifier of the bus according to the chip identifier chip_id and operating mode of the port, and transfer the command to another chip (not shown in FIG. 2) connecting to the bus and the digital circuit 210.

Figure 2B:
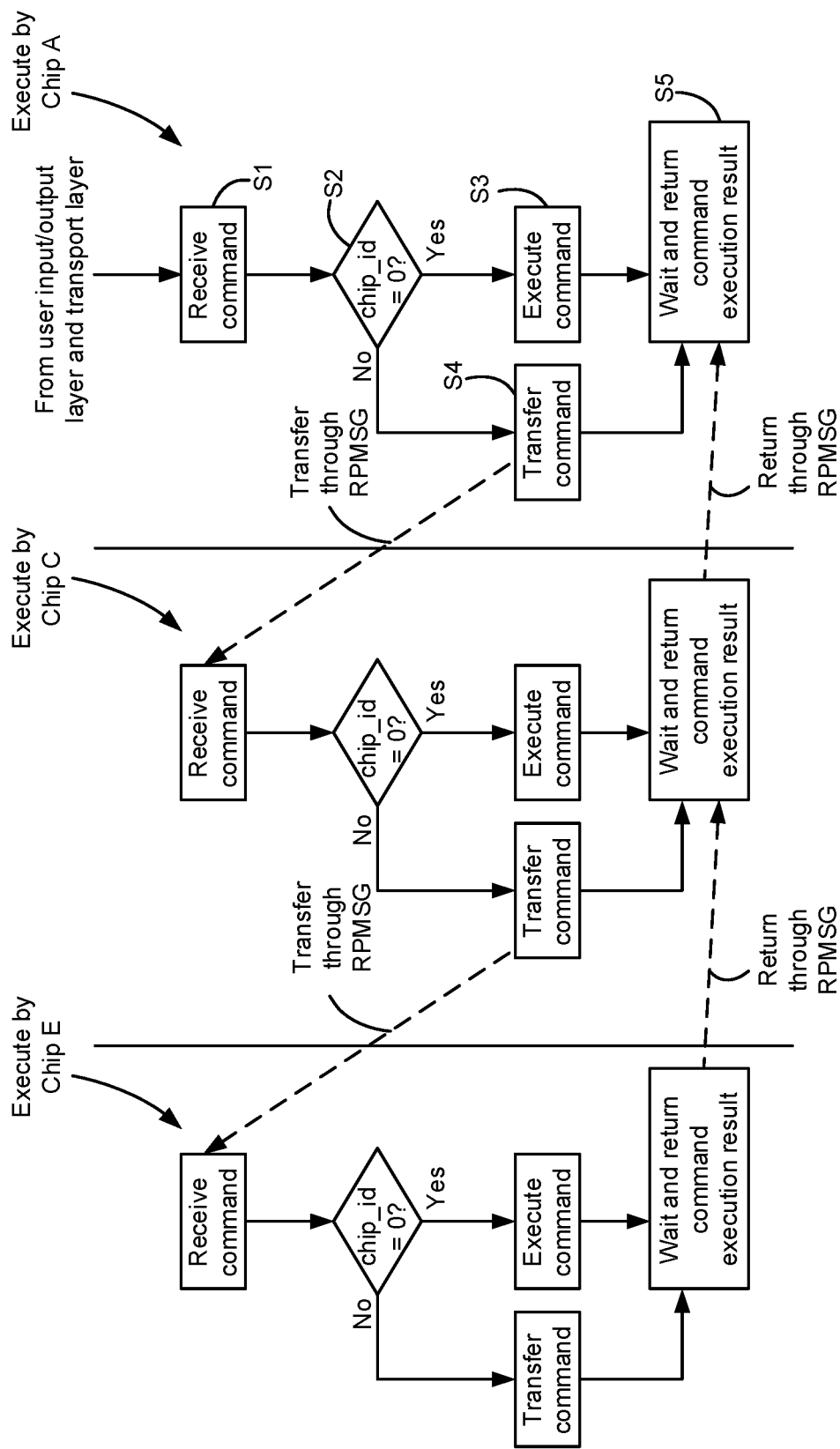
FIG. 2B is a flowchart of command transfer according to some embodiments of the present application.

FIG. 2B shows a flowchart of command transfer according to some embodiments of the present application. In general, input/output of a command can be sequentially divided into a user input/output layer, a transport layer and an execution layer. For better understanding, FIG. 2B depicts only the operation process of execution layers related to the chip A, the chip C and the chip E in FIG. 1.

Once the chip A receives a command (operation S1), the chip A can determine according to the chip identifier chip_id whether to perform the command (operation S2). For example, if the command indicates the target address of the chip A, the chip A can set the chip identifier chip_id to a predetermined value (the predetermined value is 0). If if the chip identifier chip_id is the predetermined value, the chip A execute the command (operation S3). Alternatively, if the chip identifier chip_id set by the chip A is not 0, transfers the command to another chip through a remote processor messaging (RPMSG) mechanism in the PCI-E interface (operation S4), and waits for the another chip to return a command execution result. Once the chip A receives a command execution result it generates or the command execution result from the another chip, the chip A can return the command execution result to the transport layer and the user input/output layer (operation S5). In some embodiments, the command execution result can be an actual processing result of the command to be executed, or a command execution failure reported by each chip (for example, the command is designated to be executed by the chip A, which however does not store the command).

Accordingly, the chip C and the chip E can perform similar operations to complete command transfer and/or execute the command. Moreover, the chip E can return the command execution result to the chip C through the RPMSG mechanism, and the chip C can return a command execution result it generates or the command execution result received from the chip E to the chip A through the RPMSG mechanism. Related operations of the chip C and the chip E are similar to the multiple operations S1 to S5 described above, and are omitted herein for brevity.

(5) Examples of Predetermined Command

First example: as described above, the predetermined command can be used to set the chip identifier of each of the chips A to E, so as to select one chip in the multichip system 100 as the current receiver-end chip to execute the transferred command. In some embodiments, the predetermined command can include "select_chip [target address of chip]". In this example, the command select_chip can be used to indicate the target address of the receiver-end chip, and after the multichip system 100 successfully executes the command select_chip, subsequent commands are then all executed by the receiver-end chip.

For example, if the chip A is to transfer the command to the chip E, the chip A can execute the command select_chip 0x41, wherein "0x41" is the target address of the chip E with respect to the chip A (referring to Table-3). Thus, the chip E can set its chip identifier chip_id to a predetermined value according to the above command, and the chip A can transfer subsequent commands to the chip E, such that the chip E executes the subsequent commands according to its chip identifier chip_id. Alternatively, in another example, if the chip A is to transfer the command to the chip E, the chip A can execute the command select_chip 0x4, and then execute the command select_chip 0x1 through the chip C, wherein "0x4" is the target address of the chip C with respect to the chip A (referring to Table-2), and "0x1" is the target address of the chip E with respect to the chip C (referring to Table-2). By consecutively executing the command select_chip 0x4 and the command select_chip 0x1, the chip E can set its chip identifier chip_id to a predetermined value so as to execute subsequent commands. In other words, in the configuration of a second-order connection, the chip A can execute the command select_chip through the target address in Table-3 so as to transfer the command to the chip E, or can consecutively execute the command select_chip twice through the target address in Table-2 and the chip C so as to transfer the command to the chip E.

If the chip E is to transfer the command to the chip A, the chip E can transfer the command to the chip A through the chip C. Since the operating mode of the port P5 of the chip E is the EP mode and the identifier of the port P5 is port 0, the target address of the chip C with respect to the chip E is 0x10000 (referring to Table-1 above). Since the operating mode of the port P2 of the chip C is the EP mode and the identifier of the port P2 is port 1, the target address of the chip A with respect to the chip C is 0x10001 (referring to Table-1 above). Accordingly, the chip E can execute the command select_chip 0x10000 (to switch the entity that executes the command to the chip C), and then the chip C can execute the command select_chip 0x10001 (to switch the entity that executes the command to the chip A), so as to transfer the command to the chip A. The above examples are described by way of application scenarios of a second-order connection, and it can be understood that the above command transfer mechanism is applicable to application scenarios of multi-order connections.

Second example: in some embodiments, the predetermined command can include "route_call [b_transfer] 'sub_command'". In this example, the command route_call can be used to control the chip to whether disconnect a previous command transfer link, and the parameter b_transfer is used to indicate to whether execute the command transfer, and the command sub_command is an actual command to be executed by a designated chip. For example, when the value of the parameter b_transfer is 1, the chip can transfer the command sub_command to another chips connected thereto, and the command sub_commmand can be execute by these chips. In contrast, when the value of the parameter b_transfer is 0, the chip does not transfer the command sub_command to another chips connected thereto, and the command sub_commmand is executed only in this chip.

For example, assume that a current command transfer connection of the multi-chip system 100 is the chip A=>the chip C=>the chip E. When the chip A executes the command route_call, if the value of the parameter b_transfer is 1, the chip A transfers the command sub_command to the chip C and the chip E, and the chip C and the chip E both execute the command sub_command. Alternatively, when the value of the parameter b_transfer is 0, the chip A does not transfer the command sub_command to the chip C or the chip E, and executes the command sub_command by itself.

In some embodiments, the command route_call can be used to disconnect the current command transfer connection. For example, a chip can execute the command route_call 1"select_chip 0", that is, the command sub_command can be set as the command select_chip 0. As such, all chips in the current command transfer connection execute the command select_chip 0, further set the respective chip identifiers chip_id to the value 0 and do not execut subsequent commands. The above examples related to the predetermined command are exemplary, and the present application is not limited to the above examples.

(6) Application Example of Actual Deployment:

Regarding the example in FIG. 1, one possible deployment example is that, the chip A is a master chip, the chip B, the chip E and the chip D are slave chips, and the chip C is a bridge chip, wherein the operating mode of the port P2 connected to the chip A is the EP mode, and the operating mode of the port P3 connected to the chip E is the RC mode. In a common system application, the chip A can operate as a main transmitter end of a command, and can initialize the multichip system 100 by executing the script below:

init_soc
    select_chip [the target address of the chip B with respect to the chip A]
    init_soc
    route_call 0 "select_chip [the target address of the chip C with respect to the chip A]"
    init_soc
    route_call 0 "select_chip [the target address of the chip D with respect to the chip A]"
    init_soc
    route_call 0 "select_chip [the target address of the chip E with respect to the chip A]"
    init_soc In the above script, the command init_soc is the command for controlling initialization of the chip, and the chip A executes the command init_soc of the first line to perform initialization. Once the initialization is completed, the chip A executes the command select_chip of the second line to transfer the command to the chip B. Thus, the chip B executes the command init_soc of the third line to perform the initialization. Then, the chip A executes the command route_call of the fourth line. Since the parameter b_transfer is 0, the chip A does not transfer the command to the chip B but executes the command select_chip to transfer the command to the chip D. Thus, the chip D executes the command init_soc of the fifth line to perform the initialization. Similarly, the chip A can use the multiple instructions of the above script to sequentially transfer the command init_soc to the other chips B to E, so as to complete the initialization of the other chips.

The above script provides one possible example of a type of application deployment, and it is to be noted that the present application is not limited to the example. It is understood from the above examples that, with the method for determining a target address and multiple methods of use of a predetermined command provided by the embodiments of the present application, a convenient and highly universally applicable command transfer mechanism can be realized in the multichip system 100, so as to better manage and control the chips in the multichip system 100.

The above examples are described by way of a PCI-E interface, and it should be noted that the present application is not limited to these examples. All signal interfaces (for example but not limited to, USB, SPI and I2C interfaces) applicable for chip connection are to be encompassed within the scope of the present application. Moreover, the above examples are described by way of functions or commands used in C++ codes and/or a software framework in a Linux system, and it should be noted that the present application is not limited to these examples. In addition, the numbers and connections of the multiple chips A to E shown in FIG. 1 are merely examples, and numbers of chips or connections of different chips are to be encompassed within the scope of the present application.

In conclusion, the multichip system according to some embodiments of the present application is capable of setting respective target addresses of various chips using operating modes and identifiers of buses of the chips. As such, a chip in the multichip system can transfer commands to another chip. The above command transfer mechanism relates to only identifiers of hardware and target addresses of scripts. Thus, the command transfer mechanism does not involve code modification, and is hence highly universally applicable.

While the present application has been described by way of example and in terms of the preferred embodiments, it is to be understood that the present application is not limited thereto. Various modifications made be made to the technical features of the present application by a person skilled in the art on the basis of the explicit or implicitly disclosures of the present application. The scope of the appended claims of the present application therefore should be accorded with the broadest interpretation so as to encompass all such modifications.

What is claimed is:

1. A multichip system, comprising:
 a transmitter-end chip, comprising a first port;
 a receiver-end chip, comprising a second port, the first port being connected to the second port, and an operating mode of the first port being different from an operating mode of the second port; and
 a bridge chip, comprising a third port and a fourth port, the third port coupled to the first port, the fourth port coupled to the second port, and an operating mode of the third port being different from an operating mode of the fourth port;
 wherein, the transmitter-end chip determines a first target address of the receiver-end chip with respect to the transmitter-end chip, and transfers a command to the receiver-end chip according to the first target address; and
 wherein the transmitter-end chip further determines a second target address of the bridge chip with respect to the transmitter-end chip according to an identifier of the first port and an identifier of a bus between the first port and the third port, determines a third target address of the receiver-end chip with respect to the bridge chip according to an identifier of the fourth port and an identifier of a bus between the fourth port and the second port, and determines the first target address according to the second target address and the third target address.

2. The multichip system according to claim 1, wherein the first port and the second port are connected through a Peripheral Component Interconnect Express (PCI-E) interface.

3. The multichip system according to claim 1, wherein one between the operating mode of the first port and the operating mode of the second port is an endpoint (EP) mode, and the other between the operating mode of the first port and the operating mode of the second port is a root complex (RC) mode.

4. The multichip system according to claim 1, wherein when the transmitter-end chip operates as a slave chip, the transmitter-end chip determines the first target address according to an identifier of the first port.

5. The multichip system according to claim 1, wherein when the transmitter-end chip operates as a master chip, the transmitter-end chip determines the first target address according to an identifier of the first port and an identifier of a bus between the second port and the first port.

6. The multichip system according to claim 1, wherein the first target address comprises a part of bits of the second target address and a part of bits of the third target address.

7. The multichip system according to claim 1, wherein the receiver-end chip stores a chip identifier and executes the command when the chip identifier is a predetermined value.

8. The multichip system according to claim 7, wherein when the receiver-end chip receives a predetermined command indicating the first target address, the receiver-end chip sets the chip identifier as the predetermined value.

9. A multichip system, comprising:
a transmitter-end chip, comprising a first port;
a receiver-end chip, comprising a second port, the first port being connected to the second port, and an operating mode of the first port being different from an operating mode of the second port; and
a bridge chip, comprising a third port and a fourth port, the third port coupled to the first port, the fourth port coupled to the second port, and an operating mode of the third port being different from an operating mode of the fourth port;
wherein the transmitter-end chip determines a first target address of the receiver-end chip with respect to the transmitter-end chip, and transfers a command to the receiver-end chip according to the first target address; and
wherein the transmitter-end chip further determines a second target address of the bridge chip with respect to the transmitter-end chip according to an identifier of the first port and an identifier of a bus between the first port and the third port and transfers the command to the bridge chip according to the second target address, and the bridge chip determines a third target address of the receiver-end chip with respect to the bridge chip according to an identifier of the fourth port and an identifier of a bus between the fourth port and the second port and transfers the command to the receiver-end chip according to the third target address.

* * * * *